United States Patent Office 3,332,950
Patented July 25, 1967

3,332,950
14-HYDROXYDIHYDRONORMORPHINONE DERIVATIVES
Harold Blumberg, Flushing, Irwin J. Pachter, Woodbury, and Zaven Matossian, Jamaica, N.Y., assignors to Endo Laboratories, Inc., Garden City, N.Y., a corporation of New York
No Drawing. Filed Dec. 6, 1966, Ser. No. 599,379
7 Claims. (Cl. 260—285)

This application is a continuation-in-part of our pending applications, Ser. No. 267,793 filed Mar. 23, 1963, and Ser. No. 280,750, filed May 15, 1963.

This invention relates to new and useful derivatives of morphine bearing selected substituents on the nitrogen atom, the effect of which is to confer narcotic antagonist properties to the molecules while at the same time conferring useful analgetic activity.

For many years attempts have been made to prepare new derivatives of morphine which are not addicting, retain analgetic potency and yet are relatively free of side effects, such as respiratory depression. For the most part, these efforts have not been rewarding.

It has been observed in recent years that when suitable substituents are introduced on the nitrogen atom of a normorphine derivative, the resulting compounds are not addicting and, indeed, are actually narcotic antagonists. Occasionally, such narcotic antagonists also have been found to have analgetic properties. However, such analgesia, when present, has generally been characterized by decreased potency, hallucinogenic side effects and respiratory depression.

Among the narcotic antagonists, the N-allyl and N-propargyl derivatives of 14-hydroxydihydronormorphinone described in British Patent 939,287 have been outstanding in that they are potent reversers of narcosis without inducing hallucinations or the respiratory depression characteristic of other narcotic antagonists. Unfortunately, tests in experimental animals have shown that these compounds are devoid of analgetic properties.

In studying other derivatives of 14-hydroxydihydronormorphinone which Von Braun (Ber. 59, 1081 (1926)) has taught could also be expected to show narcotic antagonist activity, we made the surprising discovery that N-(3'-methyl-2'-butenyl) - 14 - hydroxydihydronormorphinone, N-cyclopropylmethyl - 14 - hydroxydihydronormorphinone and N-cyclobutylmethyl-14-hydroxydihydronormorphinone of Formula I below, unlike the N-allyl and N-propargyl derivatives, are analgetics as well as narcotic antagonists. Furthermore, their analgetic action is not accompanied by undesirable side effects characteristic of previously known analgetic narcotic antagonists.

The compounds of this invention have Formula I

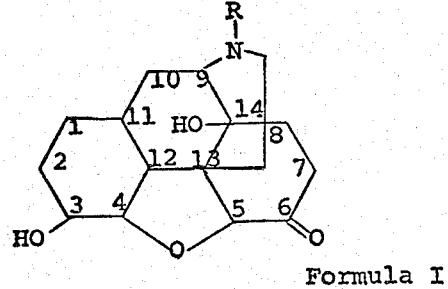

Formula I wherein R is 3'-methyl-2'-butenyl, cyclopropylmethyl or cyclobutylmethyl.

The preparation of the compounds of this invention may be exemplified by the flow sheet which illustrates the preparation of N-cyclobutylmethyl-14-hydroxydihydronormorphinone. Related procedures afford the other compounds of this invention.

When the substituting reagent is in the oxidized form, powerful reducing agents such as lithium aluminum hydride, potassium borohydride in the presence of lithium chloride, aluminum hydride in the presence of lithium chloride, sodium borohydride in the presence of aluminum chloride, diborane and the like must be employed to reduce the amide carbonyl of the intermediate product. Such reducing agents also reduce ketone carbonyl groups to alcohols. In order to retain the ketone carbonyl in the final product, it may either be protected during the reduction step by temporary conversion into an acetal such as the cyclic ethylene acetal, the cyclic trimethylene acetal, a lower alkyl acetyl such as the dimethyl acetal or the dipropyl acetal, a lower alkyl enol ether, such as the methyl ether, the ethyl ether or the butyl ether, or like group resistant to hydride reduction, or it may be permitted to undergo reduction to the alcohol and later be reoxidized to the ketone by Oppenauer oxidation using potassium t-butoxide and benzophenone, aluminum isopropoxide and 1-tetralone or related reagent pair, or by other oxidative process involving reagents such as chromic acid, chromium trioxide in pyridine or the like.

In accord with the freedom from side effects, the compounds of this invention have very low toxicity, the subcutaneous $LD_{50}$ (dose killing 50% of the animals) being between 400 and 600 mg. per kg. in mice.

To demonstrate the analgetic potency of the compounds of this invention and thus to indicate use of these agents as non-addicting analgetics in their own right in animals and man, N-(3'-methyl-2'-butenyl)-14-hydroxy dihydronormorphinone, in the form of its hydrochloride salt, was injected by the intramuscular route post-operatively in man. The analgetic effect produced by a 35 mg dose was approximately the same as that produced by a dose of 15 mg. of morphine sulfate or by a dose o 100–200 mg. of meperidine hydrochloride. More impor tantly the compound was found to be free of side effect that have hampered all prior non-addicting analgetics To demonstrate the narcotic antagonist potency of th compounds of this invention, and thus to indicate use o these agents in counteracting narcotic overdosage, in th detection of narcotic addition, and post-operatively to hasten recovery from surgery or labor after narcoti analgesia (veterinary and human), rats were narcotized with 0.4 mg. per kg. of oxymorphone. The animals, whicl fell on their sides, were then injected subcutaneously wit as little as 0.005 mg. per kg. of N-cyclopropylmethyl 14-hydroxydihydronormorphinone. Rapidly, they wer roused from their stupor and restored to normal alertness activity and locomotion.

Narcotic antagonist potency is not directly related t analgetic potency, for N-cyclopropylmethyl-14-hydrox) dihydronormorphinone, which has analgetic propertie in the rat is approximately twice as potent as an antag( nist as N-allyl-14-hydroxydihydronormorphinone, whic has none.

Although a compound such as N-allyl-14-hydroxydih

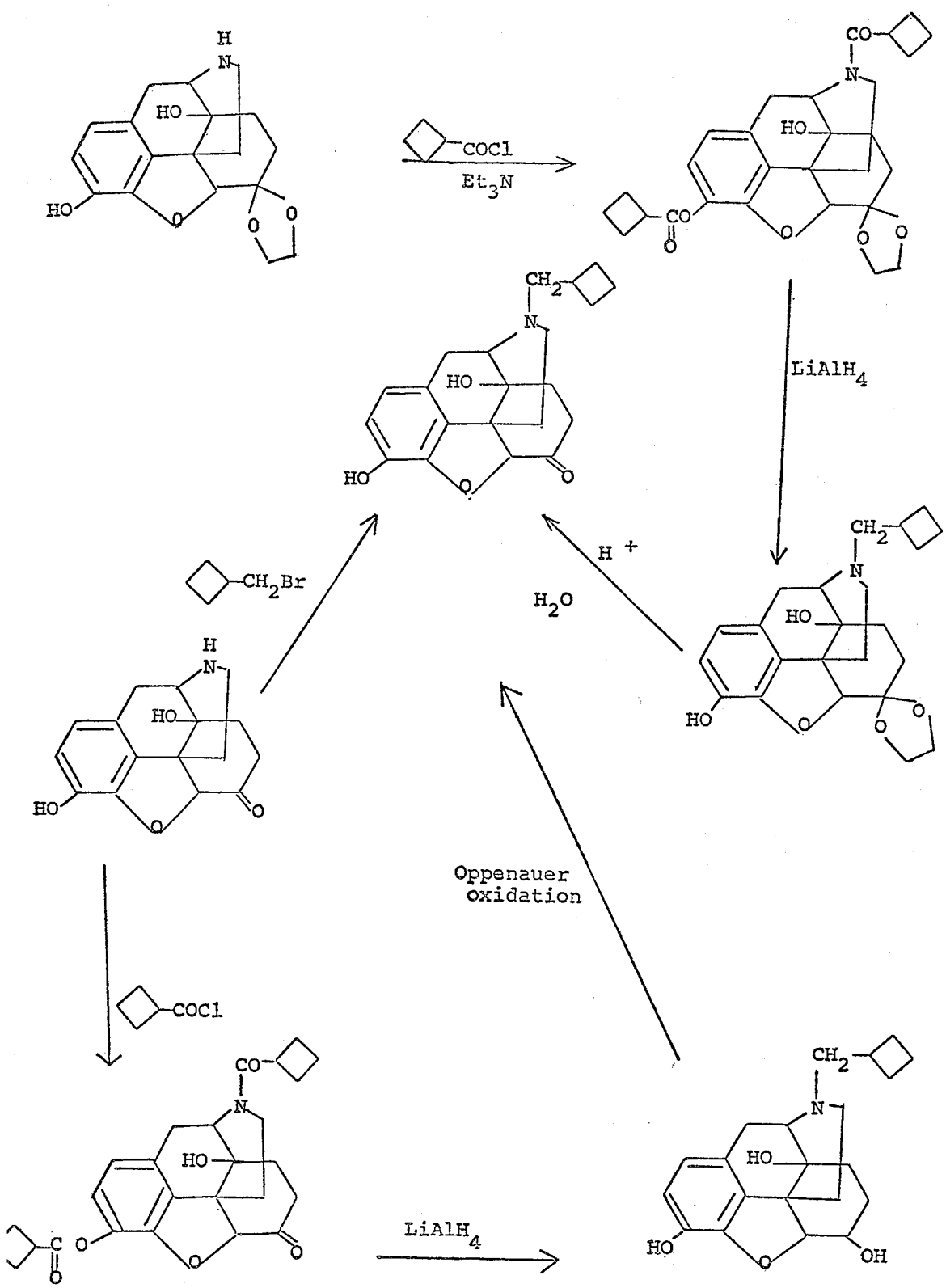

normorphinone is closely related in structure to the compounds of our invention, we made the further remarkable discovery that the analgetic effects produced by our new compounds may be antagonized by N-allyl-hydroxydihydronormorphinone. Clearly then, the new compounds, though chemically related, are biologically distinct from their previously described relative.

The non-addicting nature of the compounds of this invention was demonstrated through negative test results in monkeys that were physically dependent upon narcotics. Furthermore, the compounds of this invention fail to produce narcosis in rats or the excitation (including the Straub tail phenomenon) in mice which are characteristic of all addicting analgetics.

A portion of the animal pharmacology accumulated during the course of our studies is summarized in the Tables I, II and III. The writhing test for analgesia as described by Blumberg et al. (Proc. Soc. Exp. Biol. Med., 118, 763 (1965)), was employed to evaluate the compounds.

TABLE I

Doses required to produce a 50% analgetic effect in the mouse:

|  | Mg./kg. |
|---|---|
| N - allyl-14-hydroxydihydronormorphinone | 100 |
| N - propargyl - 14 - hydroxydihydronormorphinone | 100 |
| N - cyclopropylmethyl-14-hydroxydihydronormorphinone | 100 |
| N - cyclobutylmethyl - 14-hydroxydihydronormorphinone | 0.40 |
| N - (3'-methyl-2-butenyl)-14-hydroxydihydronormorphinone | 8.3 |

TABLE II

Doses required to produce a 50% analgetic effect in the rat:

|  | Mg./kg. |
|---|---|
| N - allyl-14-hydroxydihydronormorphinone | 100 |
| N - propargyl - 14 - hydroxydihydronormorphinone | 100 |
| N - cyclopropylmethyl - 14 - hydroxydihydronormorphinone | 0.5 |
| N - cyclobutylmethyl - 14 - hydroxydihydronormorphinone | 0.06 |
| N - (3' - methyl-2'-butenyl)-14-hydroxydihydronormorphinone | 0.7 |

TABLE III.—ANTAGONISM OF THE ANALGETIC EFFECT OF DOSES OF N-(3'-METHYL-2'-BUTENYL)-14-HYDROXY-DIHYDRONORMORPHINONE BY DOSES OF N-ALLYL-14-HYDROXYDIHYDRONORMORPHINONE

| 3'-methyl-2'butenyl compound, mg./kg. | Allyl compound, mg./kg. | Analgesia, percent |
|---|---|---|
| 20 | 0.0 | 87 |
| 20 | 0.1 | 70 |
| 20 | 0.2 | 40 |
| 20 | 0.4 | 10 |
| 20 | 0.8 | 0 |

The compounds are particularly useful in the form of addition salts thereof with pharmaceutically acceptable acids, as for example, hydrochloric, sulfuric, citric and the other acids, of which there are many, customarily employed in the pharmaceutical field in connection with the administration of nitrogen-containing compounds.

The dosages of the compounds are: for narcotic antagonism—about 0.1 to 10 mg.; and for analgesia—about 0.5 to 50 mg.

These new compounds in the form of their pharmaceutically acceptable acid addition salts can be administered for narcotic antagonism, from ampoules or vials. For analgesia, these compounds in the form of the mentioned salts or the free base, may be put up, in addition to the vials or ampoules mentioned, as tablets (hypodermic, sublingual or oral, compounded according to known pharmaceutical methods), or as liquids, e.g., syrups and elixirs, or as rectal suppositories, etc. In short, in dosage or dispensible forms as combinations of the active compound and an acceptable vehicle.

Details of suitable preparative procedures are disclosed in the following examples.

EXAMPLE 1

N-(3'-methyl-2'-butenyl)-14-hydroxydihydronormorphinone

A solution of 14.4 g. of 14-hydroxydihydronormorphinone, 14.9 g. of 1-bromo-3-methyl-2-butene and 550 ml. of dimethylformamide was heated at 65° for six days. The solvent was removed under reduced pressure and the residue was dissolved in 270 ml. of water. The resulting solution was clarified with charcoal and adjusted to pH 9. There was obtained 11.9 g. of crude product, M.P. 248–250°. Recrystallization from chloroform and methanol raised the M.P. to 265.5°.

The hydrochloride salt, prepared by passing hydrogen chloride into a chloroform solution of the base, melted at 264–265°.

EXAMPLE 2

N-cyclopropylmethyl-14-hydroxydihydronormorphinone

Method a.—A solution of 14.4 g. of 14-hydroxydihydronormorphinone, 13.5 g. of cyclopropylmethyl bromide and 550 ml. of dimethylformamide was heated at 70° for one week. The solvent was removed by distillation under reduced pressure and the residue was dissolved in water. The resulting solution was clarified with charcoal and adjusted to pH 9. The product precipitated. It was collected and recrystallized from acetone. There was obtained 10.0 g. of product, M.P. 168–170°.

The hydrochloride salt, prepared by treating the base with excess six normal hydrochloric acid, melted at 274–276° after recrystallization from methanol.

Method b.—A mixture of 28.7 g. of 14-hydroxydihydronormorphinone, 31.1 g. of ethylene glycol, 20.0 g. of p-toluenesulfonic acid and 250 ml. of benzene was heated under reflux with stirring for 35 hours. After cooling, the benzene layer was decanted and the glycol layer was diluted with 500 ml. of water and 10 ml. of concentrated aqueous ammonia. The cyclic ethylene acetal crystallized. It was collected, washed with methanol and recrystallized from 1:1 methanol-chloroform to give 23.8 g., M.P. 311–313°.

To a mixture of 15.0 g. of the acetal in 200 ml. of methylene chloride and 64 g. of triethylamine was added 16 g. of cyclopropane carboxylic acid chloride in 100 ml. of methylene chloride over a period of 25 minutes. The resulting mixture was then heated under reflux for five hours and cooled. Triethylamine hydrochloride was removed by filtration. The filtrate was evaporated to dryness and diluted with water. The N,O-dicyclopropylcarbonyl derivative separated; M.P. 219–220° after recrystallization from acetone.

A 10 g. sample of the dicyclopropylcarbonyl compound in 300 ml. of tetrahydrofuran was stirred for 24 hours with 3.0 g. of lithium aluminum hydride. The resulting mixture was then heated under reflux for one hour, cooled, diluted with 31 ml. of ethyl acetate and then with 300 ml. of saturated aqueous ammonium chloride. Inorganic material was removed by filtration. The tetrahydrofuran layer was evaporated to dryness and the residue was recrystallized from acetonebenzene. The N-cyclopropylmethyl-14-hydroxydihydronormorphinone cyclic ethylene acetal thus produced melted at 220–221°.

Heating a 2 g. portion of the resulting N-cyclopropyl methyl acetal with 20 ml. of 1 N hydrochloric acid fo two hours on a steam bath resulted in hydrolysis of th acetal to produce N-cyclopropylmethyl-14-hydroxydihy dronormorphinone hydrochloride, M.P. 274–276°.

EXAMPLE 3

N-cyclobutylmethyl-14-hydroxydihydronormorphinone

Method a.—The compound was prepared from 14-hy droxydihydronormorphinone and cyclobutylmethyl bro mide by the method of Example 2a. It melted at 151–152 upon recrystallization from ether. The hydrochloride sa melted at 256–258°.

Method b.—To a slurry of 110.5 g. of 14-hydroxyd hydronormorphinone in 2.5 l. of methylene chloride an 280 ml. of triethylamine was added a solution of 106 g. of cyclobutanecarboxylic acid chloride in 500 ml. of methylene chloride. The temperature of the reaction mixture was maintained at 20 to 25° during the addition. After five minutes, the reaction mixture was brought to reflux and heated thusly for five hours. It was then cooled, washed with water, dried over sodium sulfate and evaporated to dryness. The residue was crystallized from benzene and pentane to give 138.5 g. of the dicyclobutanecarbonyl derivative, M.P. about 112° (dec.).

The dicyclobutanecarbonyl derivative (136.7 g.) was dissolved in 200 ml. of tetrahydrofuran and added dropwise to a suspension of 34.2 g. of lithium aluminum hydride in one liter of tetrahydrofuran. The temperature of the mixture rose to reflux during the addition. Reflux was maintained for two hours after the addition was completed. After cooling, 110 ml. of ethyl acetate was added dropwise, followed by 30 ml. of water, followed by a solution of 53 g. of ammonium chloride in 125 ml. of water. The resulting mixture was filtered and the inorganic precipitate was washed with methanol. Evaporation of the combined filtrates gave 66 g. of N-cyclobutylmethyl - 14 - hydroxydihydronormorphine, M.P. 229–31°.

A suspension of freshly prepared potassium t-butoxide (made from 5 g. of potassium metal) in anhydrous benzene was heated under reflux for 2.5 hours with 13 g. of N-cyclobutylmethyl - 14 - hydroxydihydronormorphine and 82 g. of benzophenone. The resulting mixture was extracted with three 80 ml. portions of three normal hydrochloric acid. The acid extracts were combined, adjusted to pH 9 and extracted with chloroform. The chloroform extract was evaporated to dryness and the dark product was extracted with ether. The ethereal solution was separated from insoluble tarry material and concentrated. The product, M.P. 151–152°, proved to be the same as that produced by Method a.

Method c.—By the procedure of Example 2, Method b, 14 - hydroxydihydronormorphinone cyclic ethylene acetal was converted into the dicyclobutanecarbonyl compound with cyclobutanecarboxylic acid chloride and thence reduced with lithium aluminum hydride to crystalline N-cyclobutylmethyl - 14 - hydroxydihydronormorphinone cyclic ethylene acetal, M.P. 167–168°. Hydrolysis of the acetal with dilute hydrochloric acid afforded the hydrochloride of the product, M.P. 257–258°, identical with the hydrochloride made by Method a.

Examples of dosage forms of the compounds

EXAMPLE 4

Parenteral form

| | Mg./cc. |
|---|---|
| Hydrochloride salt of N-cyclopropylmethyldihydro-14-hydroxynormorphinone | 0.5 |
| Sodium chloride | 9.0 |
| Methyl paraben | 1.8 |
| Propyl paraben | 0.2 |
| Water for injection | q.s. |

The solution is prepared by first dissolving the parabens in hot water for injection, cooling to room temperature and dissolving the compound and sodium chloride. It is then filtered, using sterile technique, through a bacteriological filter (0.6 micron or smaller porosity), after which it is filled with ampoules or multiple-dose vials with the equipment commonly used in the pharmaceutical industry.

EXAMPLE 5

Oral form

| | Mg./tablet |
|---|---|
| Hydrochloride salt of N-cyclobutylmethyldihydro-14-hydroxynormorphine | 50 |
| Starch | 50 |
| Lactose | 75 |
| Magnesium stearate | 2 |
| Stearic acid | 5 |

The compound, a portion of the starch, and the lactose are combined and wet granulated with starch paste. The wet granulation is placed on trays and allowed to dry overnight at a temperature of 45° C. The dried granulation is comminuted in a comminutor to a particle size of approximately 20 mesh. Magnesium stearate, stearic acid, and the balance of the starch are added and the entire mix blended prior to compression on a suitable tablet press. The tablets are compressed at a weight of 232 mg. using a 11/32" punch with a hardness of 4 kg. These tablets will disintegrate within a half hour according to the method described in USP XVI.

EXAMPLE 6

Suppositories

| | Percent |
|---|---|
| Hydrochloride salt of N-(3'-methyl-2'-butenyl)-dihydro-14-hydroxynormorphinone | 1.66 |
| Polyoxyethylene 1000 (approx. M 1000) | 80.14 |
| Polyoxyethylene 4000 (approx. M 4000) | 15.0 |
| Methyl paraben | .15 |
| Propyl paraben | .05 |
| Purified water USP | 3.0 |

The HCl salt of the compound is dissolved in the water and added to a melted mixture of the polyoxyethylenes which already were combined with the parabens. This molten mixture is poured into suppository molds and cast into suppositories weighing 3 grams each. They are frozen to solidify and packaged into foil. These suppositories liquefy in the rectal area due to a combination of body heat and moisture thus releasing the active substance which is rapidly absorbed. This provides a concentration of 50 mg./suppository.

We claim:
1. A compound selected from the group consisting of (1) N - substituted 14 - hydroxydihydronormorphinone wherein the N-substituent is 3'-methyl-2'-butenyl, cyclopropylmethyl or cyclobutylmethyl, and (2) the addition salts of (1) with pharmaceutically acceptable acids.
2. A compound in accordance with claim 1 wherein (1) is N-(3'-methyl-2'-butenyl) - 14 - hydroxydihydronormorphinone.
3. A compound in accordance with claim 1 wherein (1) is N-cyclopropylmethyl - 14 - hydroxydihydronormorphinone.
4. A compound in accordance with claim 1 wherein (1) is N-cyclobutylmethyl - 14 - hydroxydihydroxynormorphinone.
5. A pharmaceutically acceptable acid addition salt of the base in accordance with claim 2.
6. A pharmaceutically acceptable acid addition salt of the base in accordance with claim 3.
7. A pharmaceutically acceptable acid addition salt of the base in accordance with claim 4.

No references cited.

ALEX MAZEL, *Primary Examiner.*

D. DAUS, *Assistant Examiner.*